United States Patent [19]

Reed et al.

[11] Patent Number: 5,130,806

[45] Date of Patent: Jul. 14, 1992

[54] JOB COMMENT/OPERATOR MESSAGES FOR AN ELECTRONIC REPROGRAPHIC PRINTING SYSTEM

[75] Inventors: Jeffrey G. Reed, Pittsford; Patricia Prokop, Webster; Nancy K. M. Rees, Farmington; Ernie L. Legg, Fairport; Thomas Zell, Victor; Paul Rulli, Webster; Elizabeth Bennett, Penfield; Harriet Carter, Fairport; Randy Hube, Rochester; Paul J. Valliere, Fairport, all of N.Y.

[73] Assignee: Xerox Corporation, Stamford, Conn.

[21] Appl. No.: 589,627

[22] Filed: Sep. 28, 1990

[51] Int. Cl.⁵ .................. H04N 1/21; H04N 1/32
[52] U.S. Cl. ..................... 358/296; 358/434; 358/438; 358/468
[58] Field of Search ............ 358/296, 434, 438, 468, 358/401, 436, 437

[56] References Cited

U.S. PATENT DOCUMENTS

| 3,751,582 | 8/1973 | Wernikoff et al. | 358/438 X |
| 4,167,322 | 9/1979 | Yano et al. | 355/3 R |
| 4,414,579 | 11/1983 | Dattilo et al. | 358/256 |
| 4,527,885 | 7/1985 | Ayata et al. | 358/468 X |
| 4,821,107 | 4/1989 | Naito et al. | 358/256 |
| 4,847,756 | 7/1989 | Ito et al. | 355/202 X |
| 4,849,816 | 7/1989 | Yoshida | 358/434 |
| 4,876,606 | 10/1989 | Banno et al. | 358/434 |
| 4,918,723 | 4/1990 | Iggulden et al. | 358/438 X |
| 4,956,723 | 9/1990 | Toda | 358/400 X |
| 4,991,028 | 2/1991 | Kokubu | 358/438 X |
| 5,023,728 | 6/1991 | Nimura et al. | 358/437 |

Primary Examiner—Joseph W. Hartary
Assistant Examiner—Eric Frahm
Attorney, Agent, or Firm—Oliff & Berridge

[57] ABSTRACT

An electronic reprographic printing system that allows the sending of messages with a print job from remote user workstations to a central reprographic printing machine. The messages can be displayed on a User Interface, such as a video monitor, and additionally printed on a break page of the print job. Also disclosed is a system for sending messages that is capable of faulting a print job until the reprographic system operator acknowledges receipt of the message. The various messages can instruct the system operator to use a particular medium for the print job, for example, or instruct the system operator how to finish (bind, wrap, etc.) a print job.

27 Claims, 16 Drawing Sheets

JOB COMMENT/OPERATOR MESSAGES FOR AN ELECTRONIC REPROGRAPHIC PRINTING SYSTEM

BACKGROUND OF THE INVENTION

1. Field of the Invention

The present invention relates to a system for sending messages with a print job from a remote work station to an electronic reprographic printing machine. In particular, the present invention relates to a system for sending messages from a remote user work station to an electronic reprographic printing machine for displaying the message to the system operator either on a user interface or on a banner or break page. The operator message can be sent with a fault command to the printer to stop the printer from operating until the operator acknowledges the operator message.

2. Description of the Related Art

It is known to transmit information contained in documents over communication lines such as telephone lines to a remote location where copies of the documents are reconstructed. Such systems typically scan the documents to form electronic images of the information contained therein, with the images then transmitted over a telephone line in the form of digital data. At the receiving end of the communication line, the electronic data may be used to modulate print apparatus for reconstructing the document being transmitted.

It is also known for users at remote locations to be networked and linked to a central printer such that pages to be printed on the printer are sent from a plurality of remote user work stations to a central printer location. Such systems allow the remote users at remote work stations to send a message with the print job, such as on the first page or last page of the job.

The related art has disclosed network printing systems which allow remote users to send messages and/or instructions.

U.S. Pat. No. 4,414,579 to Dattill discloses a copier-printer in an information transmitting and receiving station used to receive and transmit documents. Information is received via a communication line and is temporarily stored in a buffer from which it is applied to the printer.

U.S. Pat. No. 4,167,322 to Yano et al discloses an electrostatic copying apparatus comprising a plurality of copying machines. A plurality of sensors are connected to the copying machines respectively for sensing copying machine status parameters. Display means are connected to the copying machines and all the sensors are interconnected so as to display the status parameters of all the copying machines, such that the user of one copying machine can determined the status of all the copying machines.

U.S. Pat. No. 4,821,107 to Maito et al discloses a multi-functional imaging apparatus having an image reading section, image forming section and an external image data entering section. The imaging apparatus is capable of functioning in a copy mode and a print mode, and comprises a modum connected to a communication line for transmitting and receiving data.

U.S. Pat. No. 4,847,756 to Ito et al discloses a data transmission system for a computer controlled copying machine comprising one data bus structure extending from a host microcomputer with slave microcomputers connected to the data bus structure through respective branches.

OBJECTS AND SUMMARY OF THE INVENTION

A system is needed, however, that allows communication between a remote user and a system operator of a reprographic system, for sending messages that will allow the system to perform the print jobs more efficiently. In some instances, it is necessary to stop the printing of the printing system either at the beginning or end (or both) of a print job in order for the system operator to receive the message and respond accordingly. Further, a flexible system for sending messages is needed that is capable of linking related messages, prioritizing the related messages and truncating the messages to meet display limitations.

A printing system is needed that is capable of relaying messages, and where messages intended for viewing by the system operator can be sent to the operator at different levels of the print protocol and linked, prioritized and truncated. For example, sometimes messages sent at different levels will convey the same information and display of these repetitive messages would be inefficient. Therefore, a system that recognizes related messages, links them for a single viewing, and truncates the messages to fit within available display limits, would be helpful for more efficient communication within an electronic reprographic printing system. A system is also needed that can recognize when it is necessary to stop printing in order for the operator to acknowledge the message sent, or to continue printing and allow the operator to view the message either on a user interface such as a video monitor, or on a break page of the print job.

Accordingly, one object of the present invention is to provide a printing system which allows for sending messages between remote user work stations and a central electronic reprographic printer.

Another object of the present invention is to provide an electronic reprographic printing system which allows for sending messages of different priorities, prioritizing the messages, linking the messages, and truncating the messages to fit within available display limits.

Another object of the present invention is to provide an electronic reprographic printing system which allows a system operator to view the messages either on a video monitor or on a break page of a print job.

Yet another object of the present invention is to provide an electronic reprographic printing system which allows for a means for stopping a print job either before or after the printing of the print job until a system operator can acknowledge the message and respond to its instructions accordingly.

BRIEF DESCRIPTION OF THE DRAWINGS

The foregoing and other objects, features and advantages of the invention will be apparent from the following more particular description of the preferred embodiments of the invention, as illustrated in the accompanying drawings, wherein.

DETAILED DESCRIPTION OF THE PREFERRED EMBODIMENTS

A. The System

Figure 1:
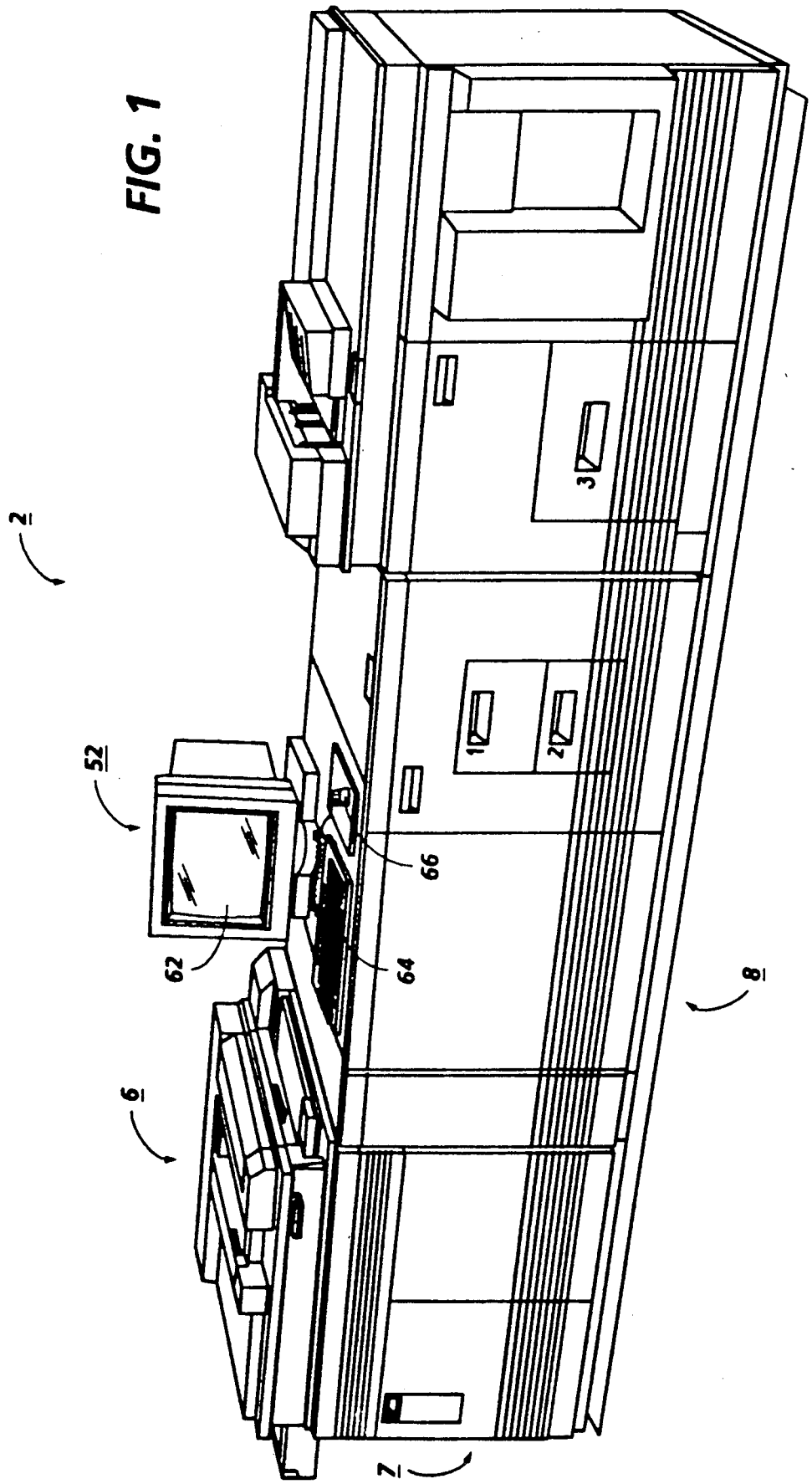
FIG. 1 is a view depicting an electronic printing system incorporating the print media identification system of the present invention.
Figure 2:
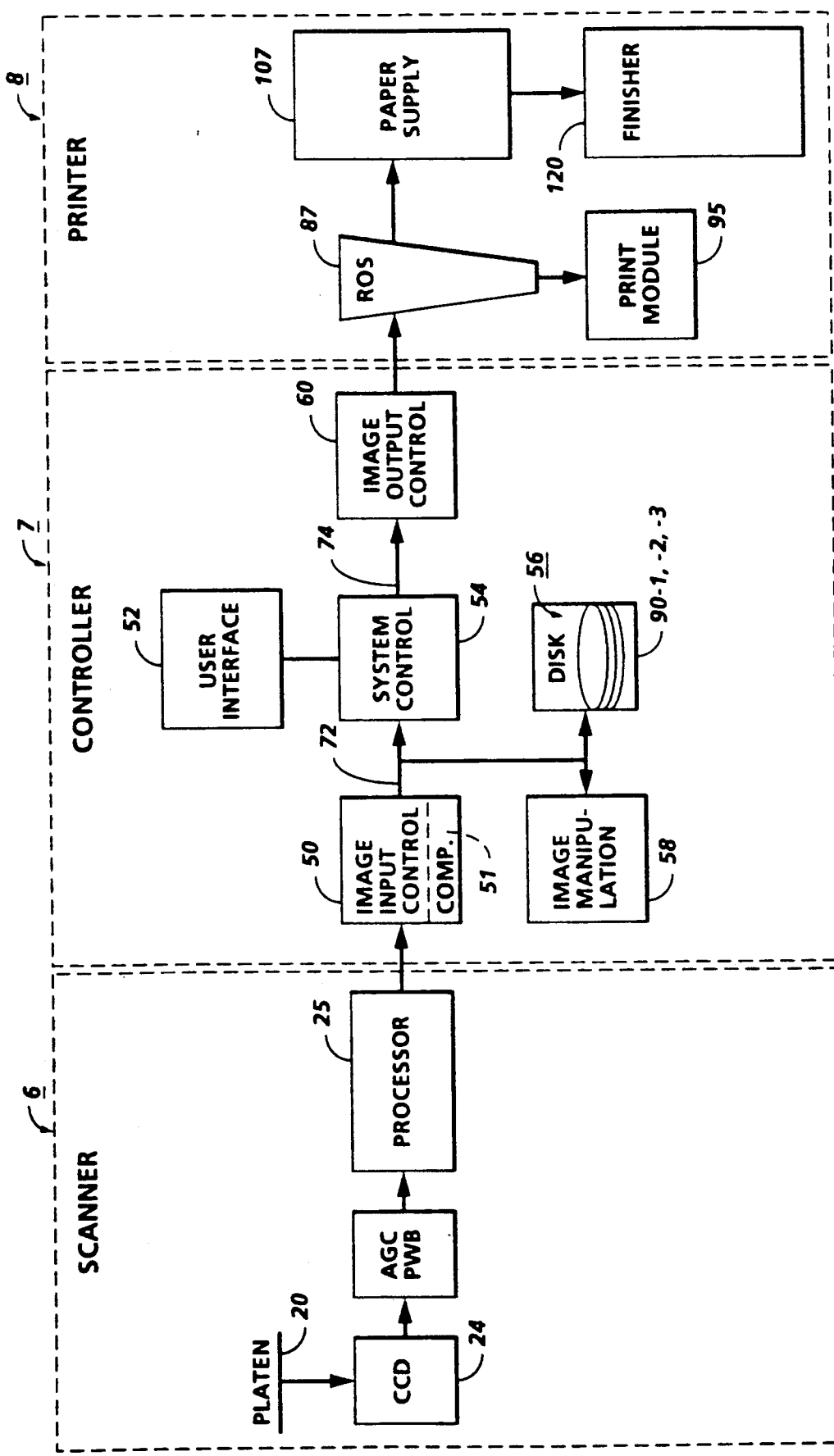
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
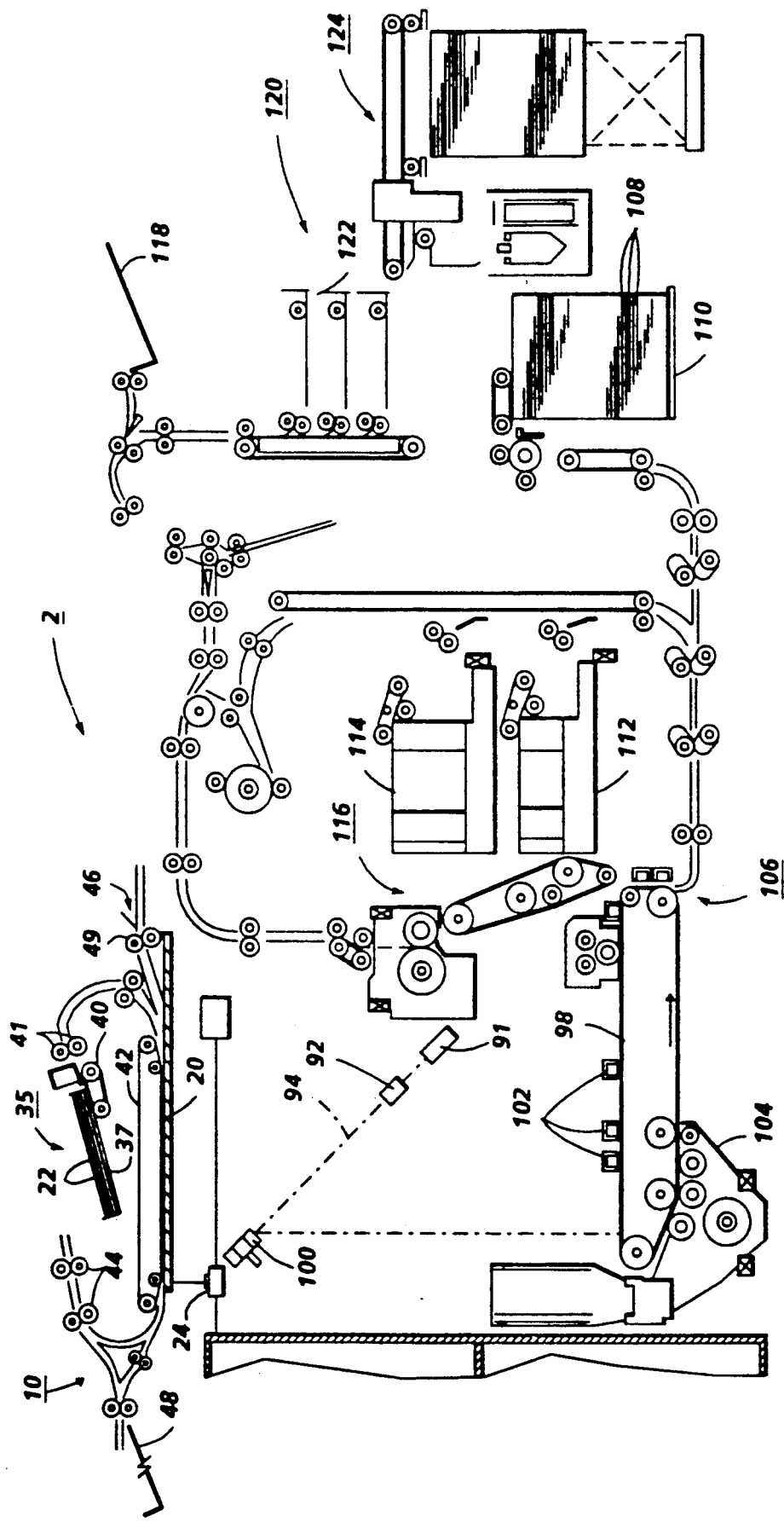
FIG. 3 is a plan view illustrating the principal mechanical components of the printing system shown in FIG. 1.
Figure 4:
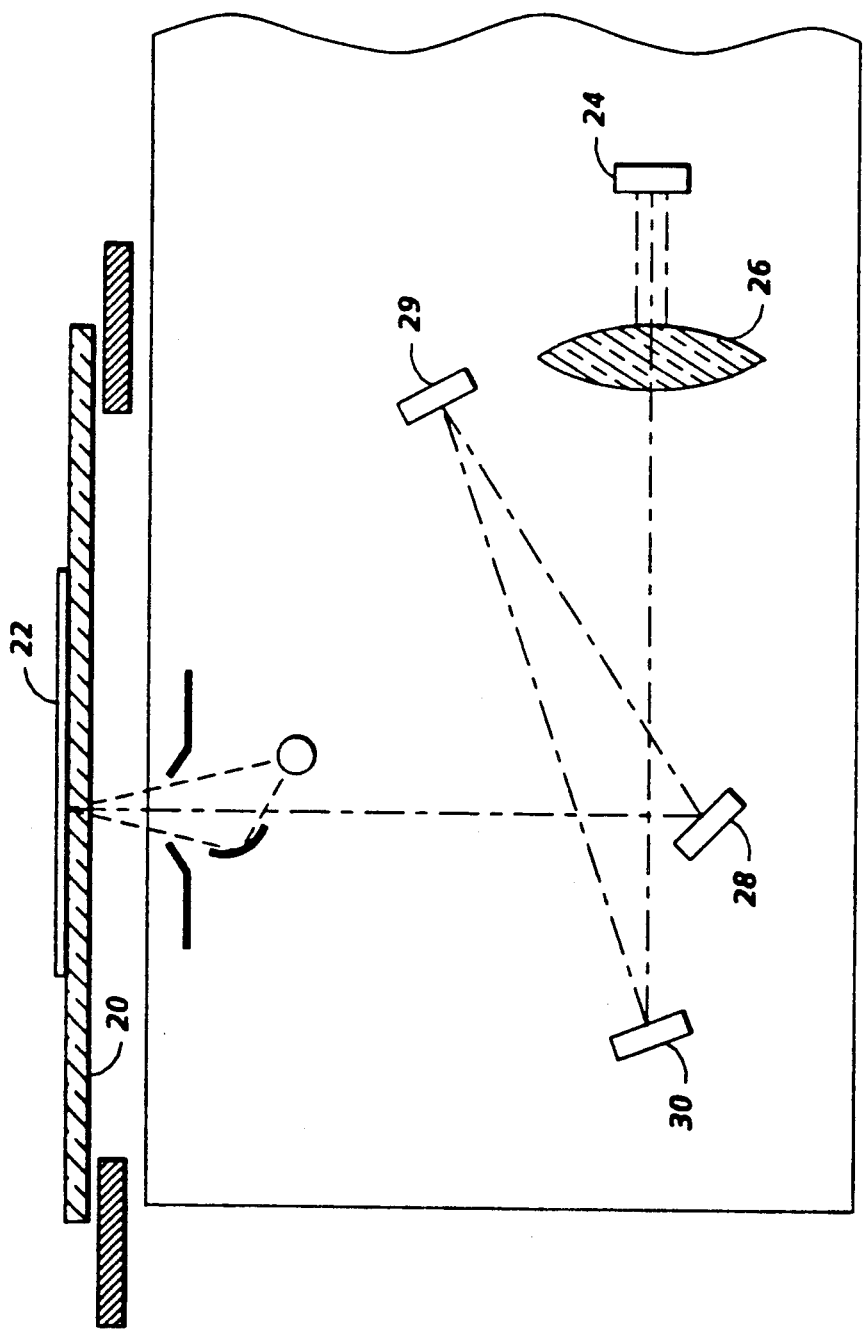
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movements below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on plate 20.

Referring to FIGS. 2 and 3, printer section 8 comprises a laser type printer and for purposes of explanation is separated into a Raster Output Scanner (ROS) section 87, Print Module Section 95, Paper section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 24 for adhesively binding the prints into books.

Referring to FIGS. 2 and 5, controller section 7 is, for explanation purposes, divided into an image input controller 50, User Interface (UI) 52, system controller 54, main memory 56, image manipulation section 58, and image output controller 60.

Figure 5A:
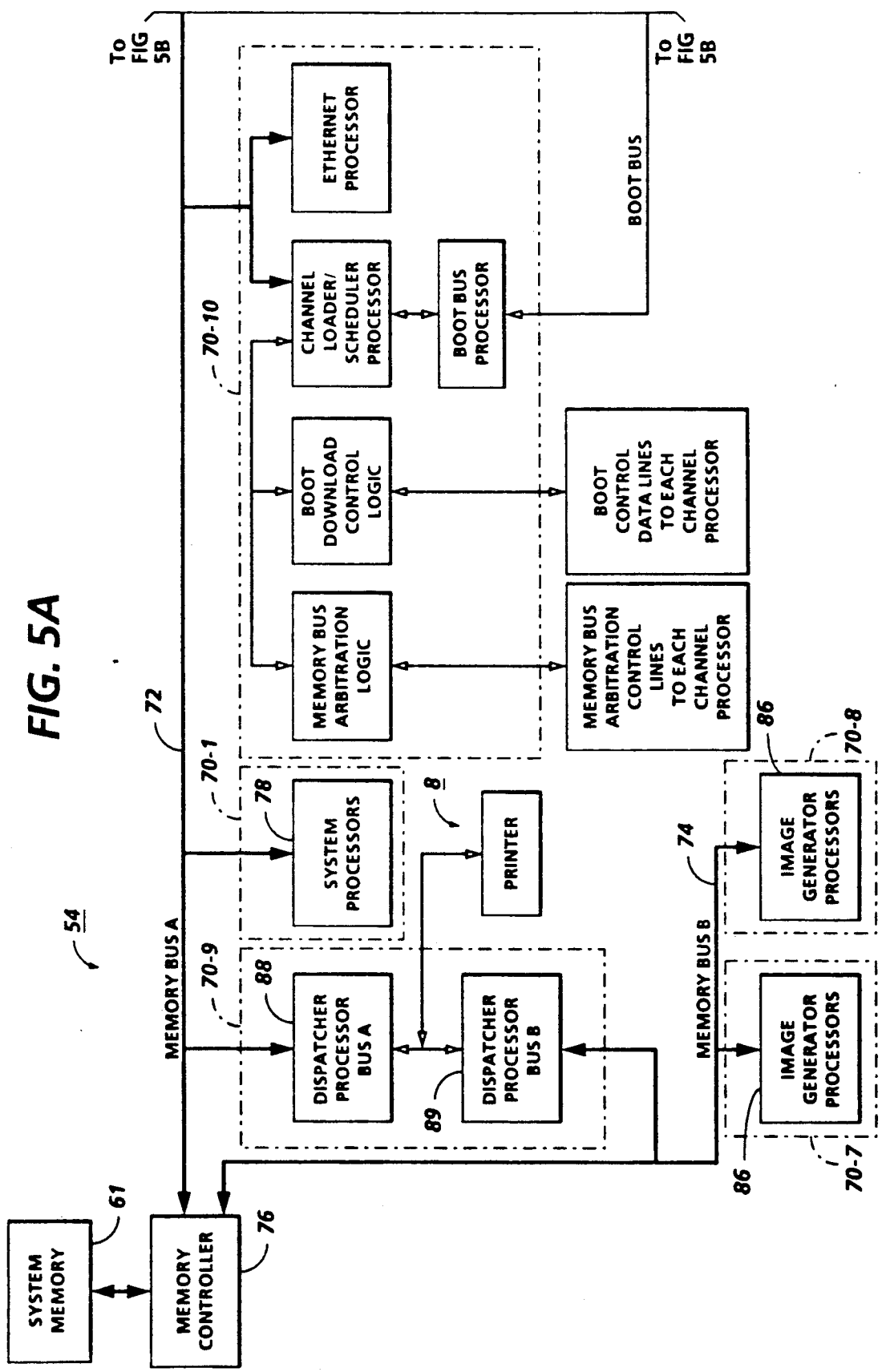
FIGS. 5a, 5b and 5c comprise a schematic block diagram showing the major parts of the control section for the printing systems shown in FIG. 1.
Figure 5B:
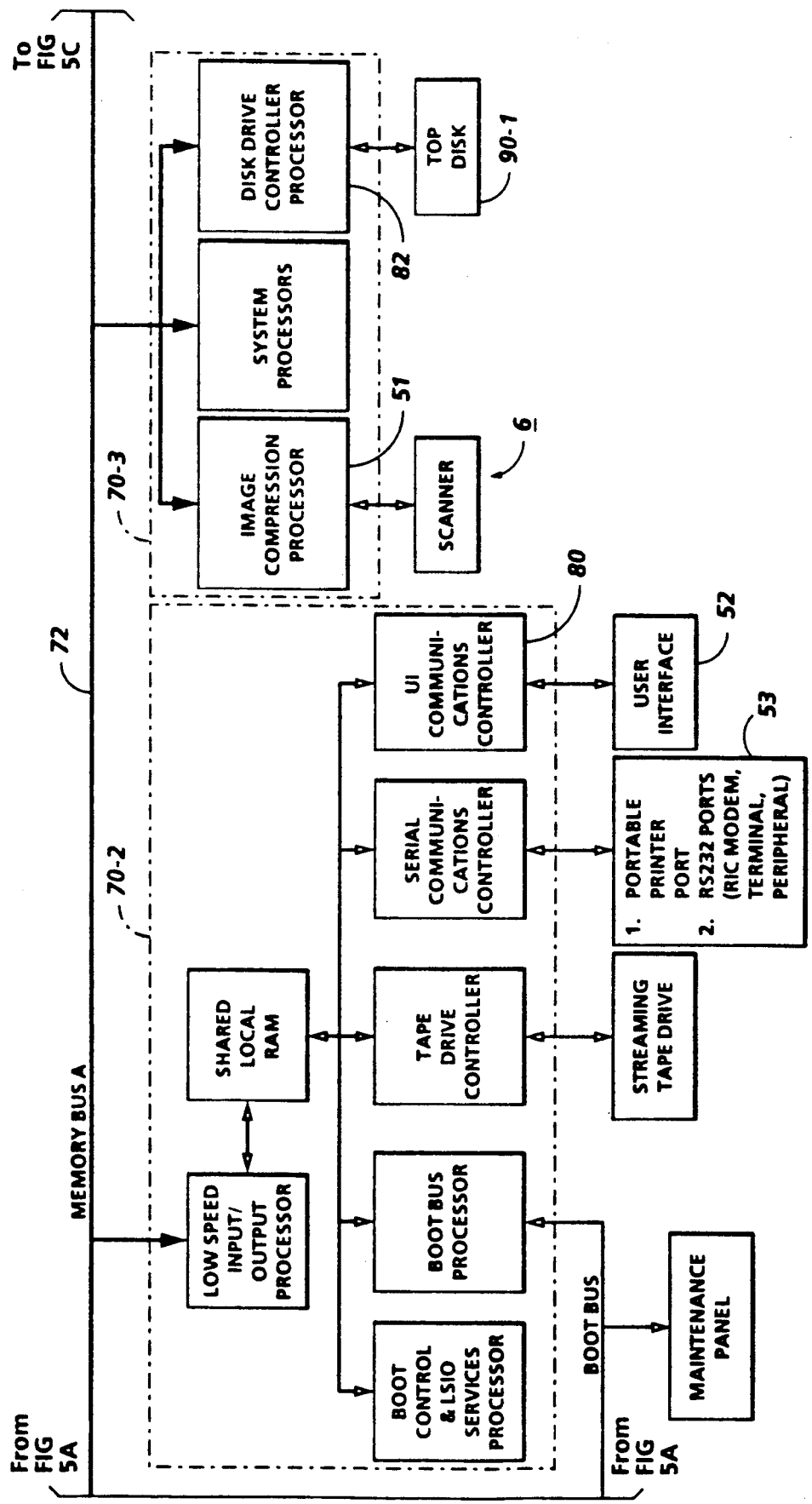
Figure 5C:
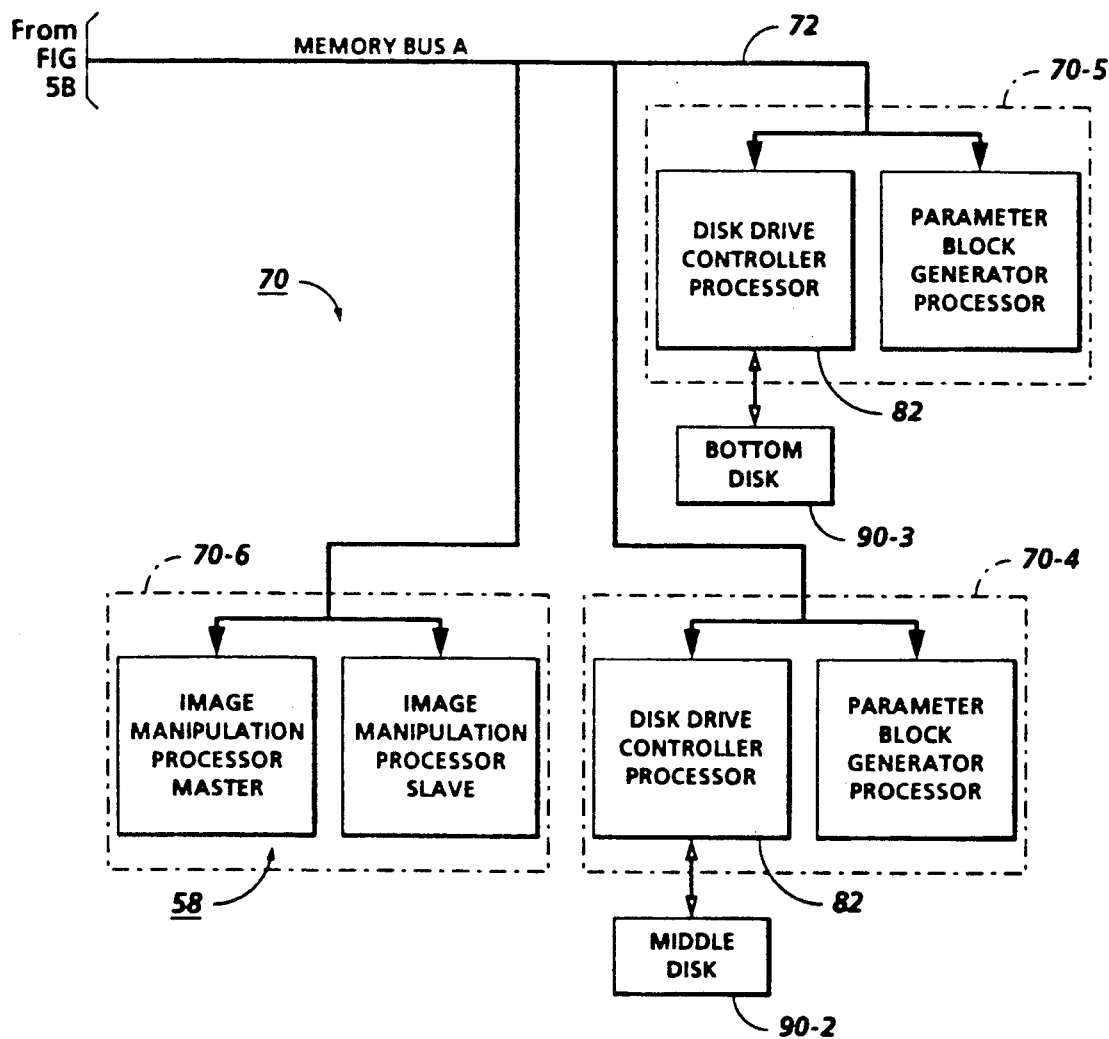

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
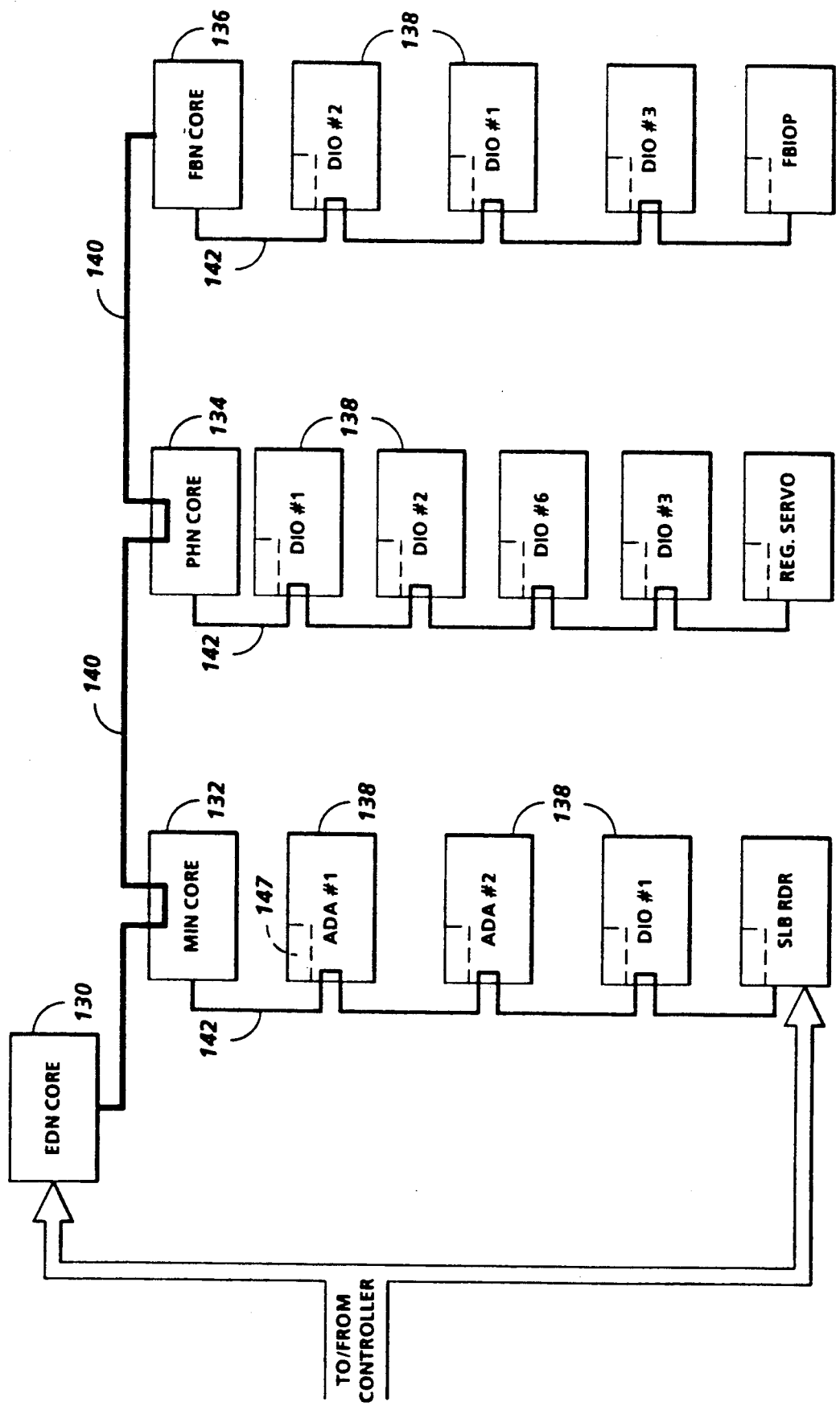
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN (electronic data mode) core PWB 130, Marking Imaging core PWB 132, Paper core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
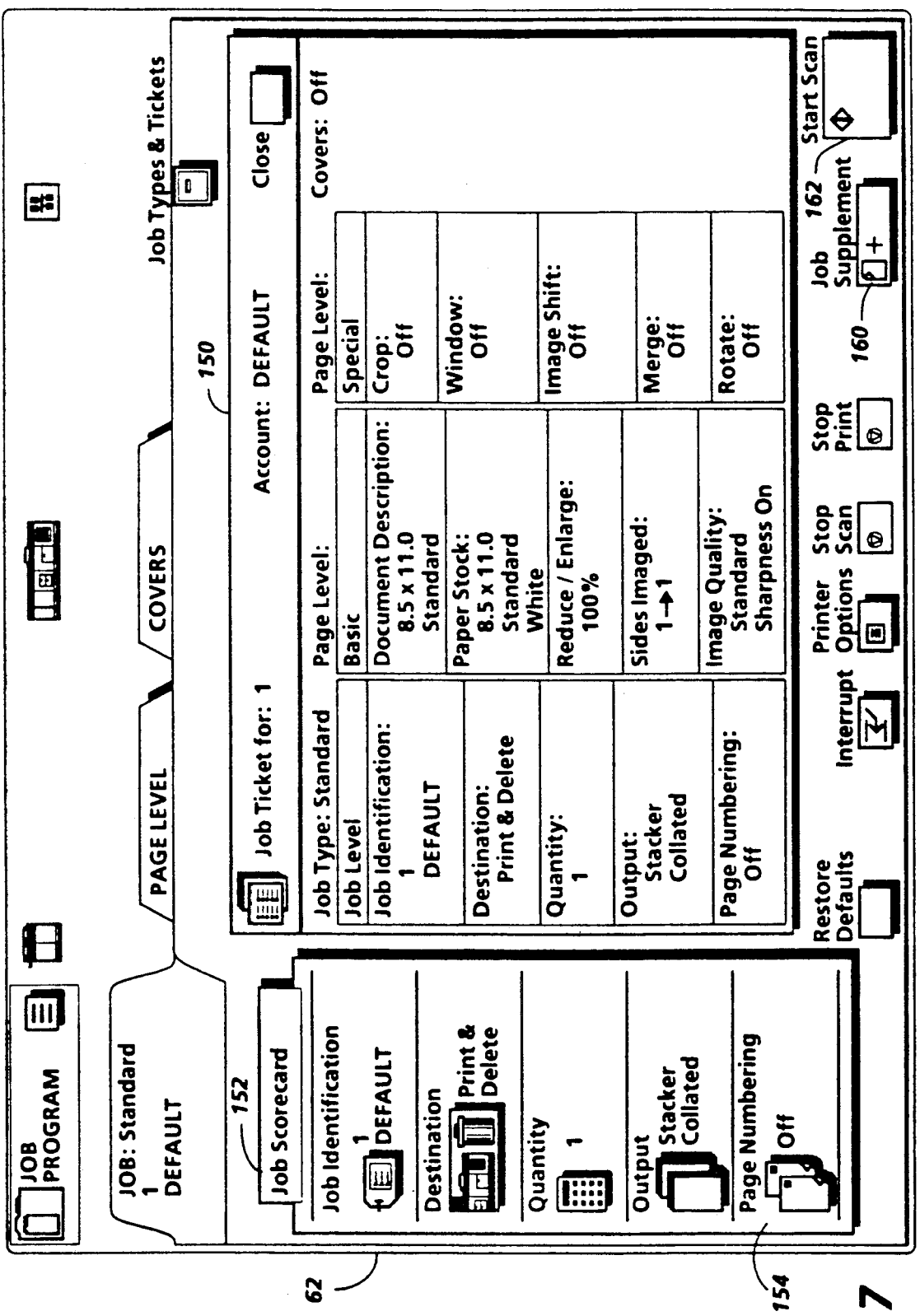
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Job Comments/Operator Messages

Electronic images that are sent to controller 7 to be manipulated at image manipulation 58 (or stored in memory), are often scanned at the scanner 6. However, the scanner 6 within the electronic reprographic system is not the only means of creating electronic page images to be sent to the controller 7 and printer 8. Remote work stations linked to the electronic reprographic printing system are capable of electronically sending page images to the reprographic system for manipulation and printing. The electronic images sent from remote work stations can be created at their respective remote locations by, for example, a remote scanner or by a remote user work station such as a personal computer. Thus, instead of scanning at scanner 6, electronic images sent from remote locations bypass scanner 6 and are sent directly to the electronic image controller 7.

Problems arise, however, when remote users wish to send specific messages or instructions concerning the print job to be printed at the reprographic system. One means of communicating specific print job instructions to the reprographic system operator would be for the remote user to telephone the operator with the specifications for the print job. Another method of sending information to the system operator would be to send a page image generated at print time with information for viewing by the system operator.

Figure 8:
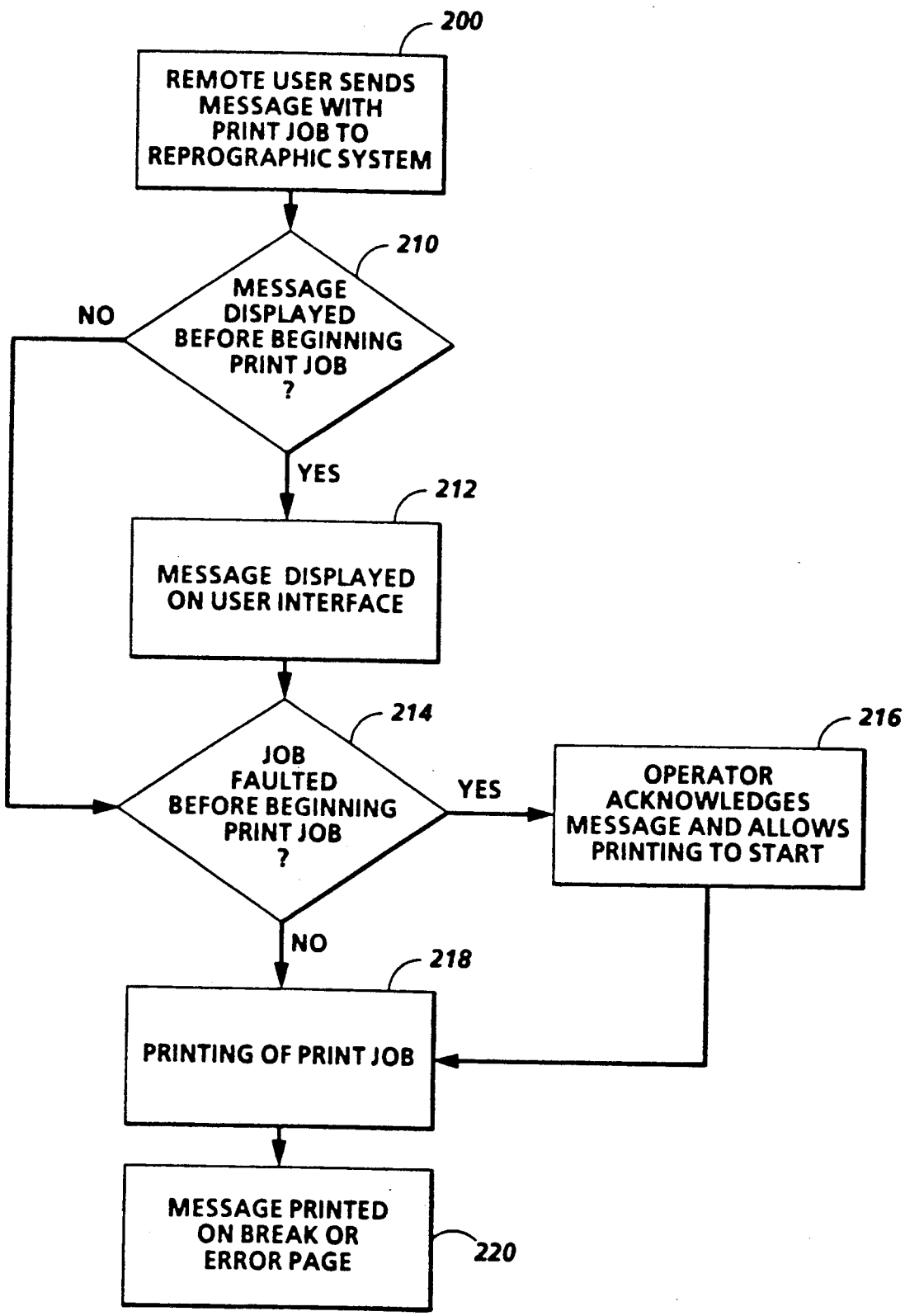
FIG. 8 is a flow chart depicting a message sent from a remote user work station to the reprographic system before the beginning of a print job.

As can be seen in FIG. 8, a remote user can send a message with a print job to the reprographic system operator (step 200) to be displayed, if necessary, at the beginning of the print job. If the message is to be displayed before printing the job (step 210), the message will appear on the UI 52 (step 212). The print job may, if desired, be faulted before the printing begins (step 214) by sending a fault command to the controller 7 of the system. The system operator must then view and respond to the message (step 216) before printing can begin (step 218). Messages to be displayed before printing a job will also be displayed on the break or error page of the print job. An example of a message sent with a fault command might be a medium message that would instruct a system operator to print the print job on a specific medium, such as pages with a company logo or a special stock such as vellum. In effect, any type of image manipulation, such as signaturization of the job, image shifting, special formatting, page numbering, or printing on special stock (such as formatted or preprinted stock, transparencies, precut tabs, colored pages, etc.) might require either a preprinting message displayed on the User Interface, or a preprinting message in combination with a job fault such that the message must be acknowledged by the system operator before printing can begin.

Figure 9:
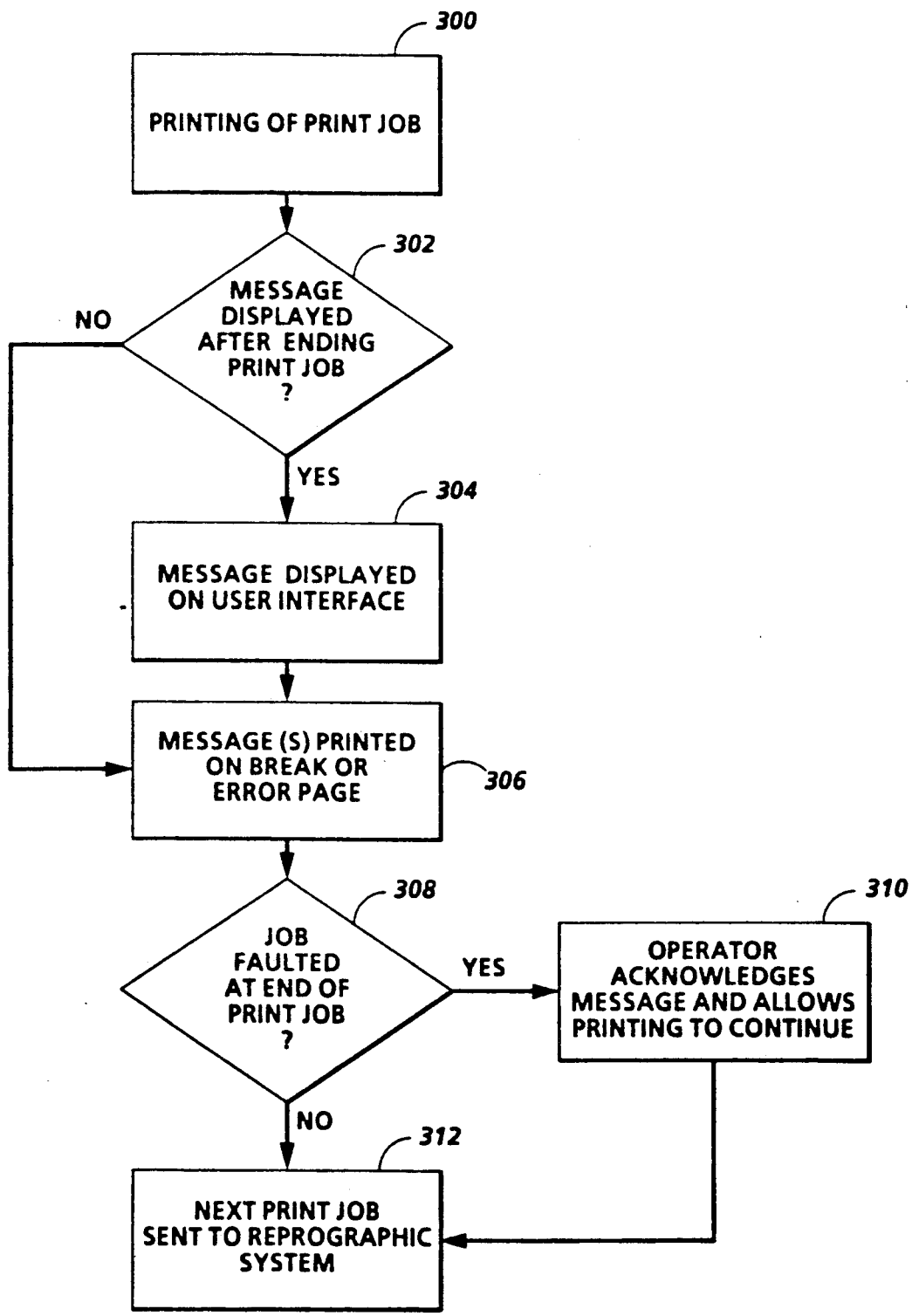
FIG. 9 is a flow chart depicting a message sent from a remote user work station to the reprographic system at the end of a print job.

As can be seen in FIG. 9, a remote user can send a message with a print job to a system operator to be displayed at the end of a print job. In such a situation, a print job is first sent to the reprographic system from the remote work station (step 300). If desired, a message can be sent for display on the user interface at the end of the print job (steps 302 and 304). If it is necessary for the system operator to review the message before continuing with any other print jobs (step 308), then a system fault can be generated as a result of the message such that the operator must acknowledge receipt of the message (step 310) before printing subsequent print jobs (step 312). Whether a system fault is sent by the remote user or not, the message will be printed on the break or error page (step 306).

Possible messages to be displayed at the end of a print job might be finishing messages that give instructions to the system operator for finishing the print job, such as stapling, stitching, binding, wrapping, trimming, folding, etc. A remote user may also send a message at the end of a print job and fault the job when instructing the system operator, for example, to remove the special medium on which the print job was printed In such a case, faulting the print job before and after the printing would be desirable, first for instructing the reprographic system to perform certain special print functions (such as image shifting, logo addition, or use of a special print medium), and then, faulting the print job at the end of the printing such that the particular print functions can be modified for standard printing of subsequent print jobs.

Messages from a remote work station to the reprographic printer can be sent at different levels. The different remote user work stations may send the messages to the reprographic system in different ways, i.e. the remote user work stations choose different methods of implementing the protocols for sending the messages. For example, one message might be sent within the interpress master and another message sent within the print protocol. Due to efficiency and space limitations, all messages sent with a print job cannot be displayed on the UI 52. Therefore, the priority of the various messages sent at different levels must be established such that the messages sent having highest priority are displayed first and lower priority messages are displayed within the available space limitations. However, all messages regardless of length are printed at the end of the print job.

Figure 10:
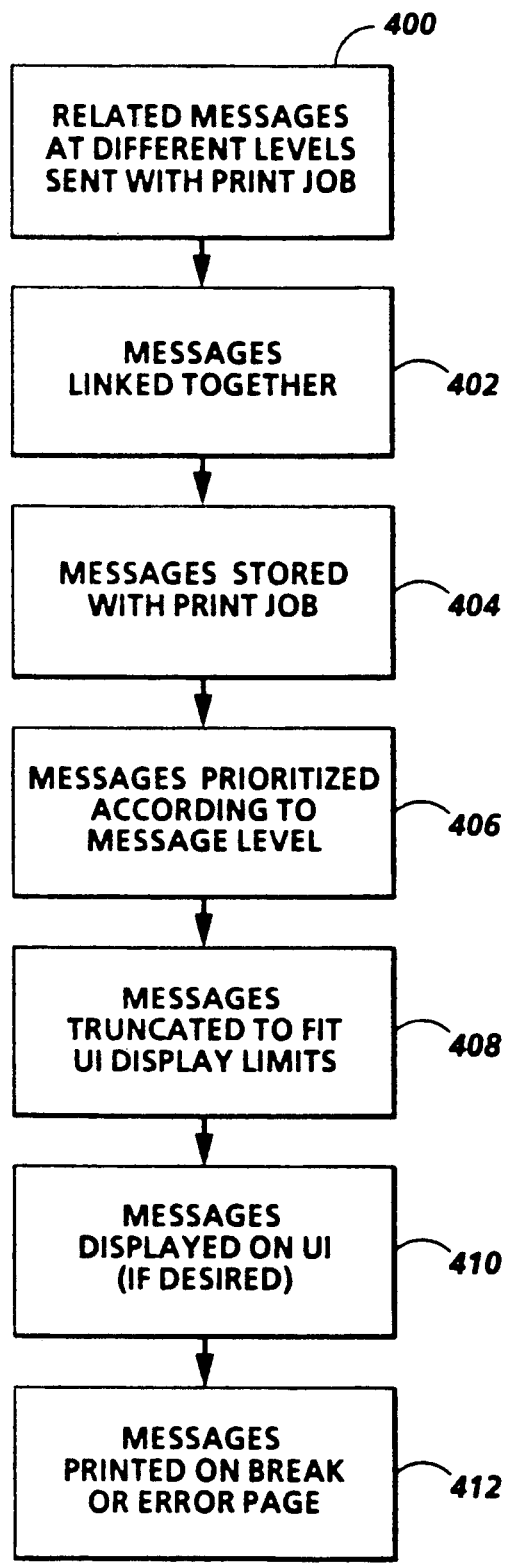
FIG. 10 is a flowchart depicting the linking, prioritizing, and truncating of messages to fit within user interface display limits.

As illustrated in FIG. 10, the controller 7 of the reprographic system must be able to receive the different messages at various levels from the different remote user work stations (step 400), link them together (step 402) and store the messages with the print job (step 404). The messages are then prioritized according to message level (step 406). After prioritization, the related messages are truncated (step 408) to fit within the display limitations of the User Interface (step 410). All messages are printed after the printing of the job. Linked and prioritized messages that do not fit completely on the break page are not truncated, but are continued on a subsequent page such as on the error page. Print jobs faulted at the beginning or end of a print job may be cleared through the normal object fault recovery mechanisms.

When the messages are sent with the print job from a remote location, the messages are immediately stored with the print job at the reprographic system location. In a case where a print job is sent to the reprographic system without a message, the print job is automatically routed to the print queue and temporarily stored in the print queue for printing. On the other hand, if a print job is sent to the reprographic system along with a message to be viewed by the system operator, the print job and message will automatically be routed to the job file and both print job and message stored therein until the operator can view the message and acknowledge its receipt.

Figure 11:
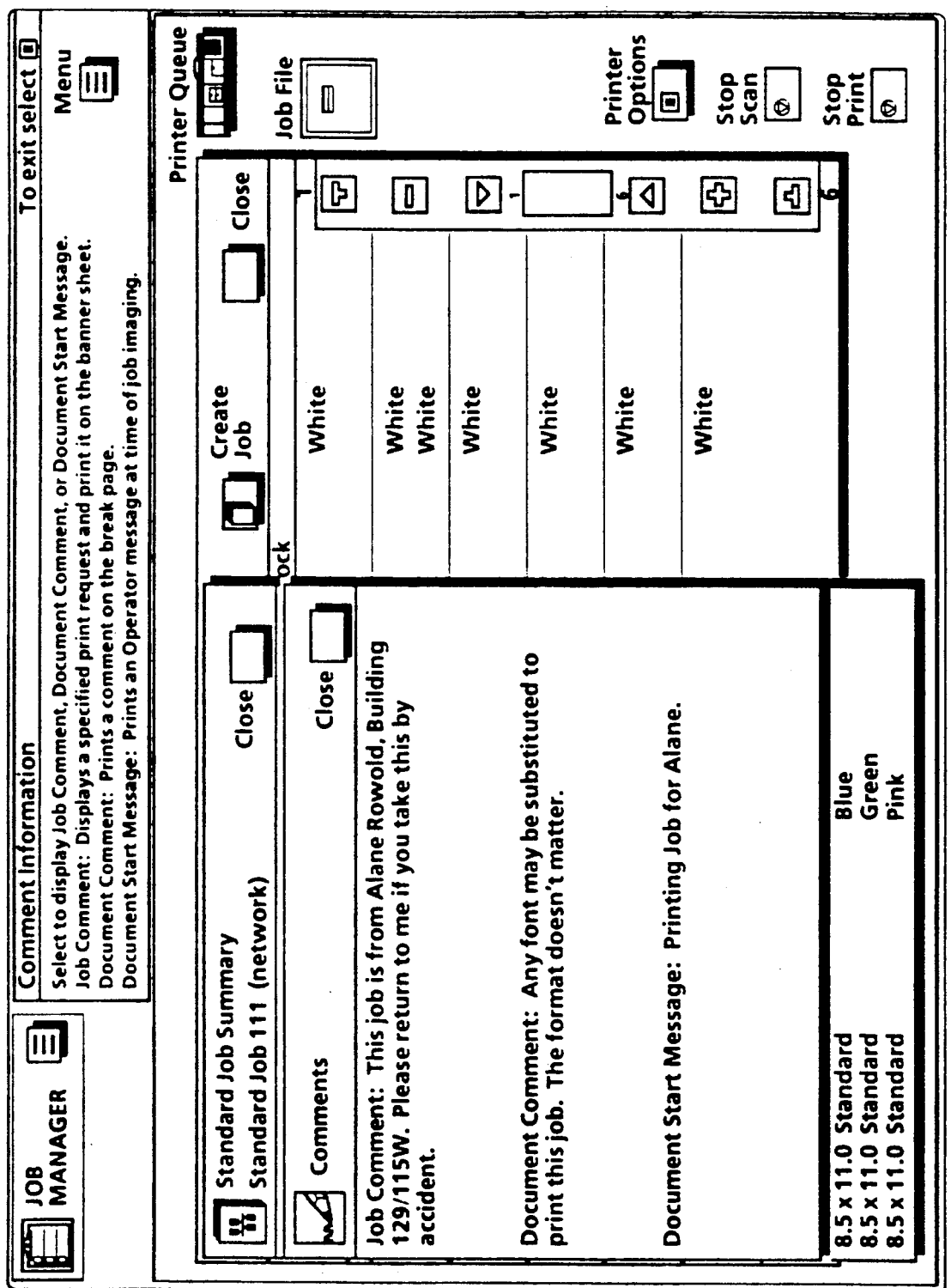
FIG. 11 is a view depicting different types of messages that might be sent with a print job.
Figure 14:
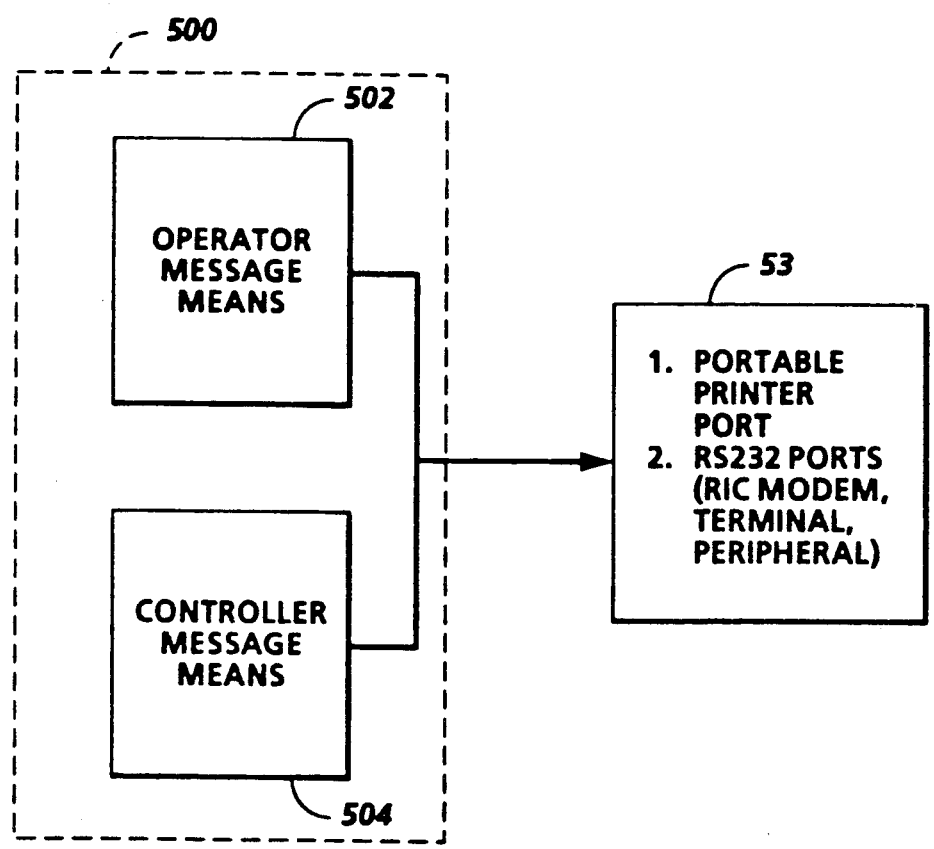
FIG. 14 is a block diagram of a sending means at a remote location from which electronic messages are sent.

In FIG. 11, there is shown a sample screen from the User Interface 52 with comments of different types displayed. On this screen, the job comment, document comment, and document start messages are displayed within the available display limits. It should be noted that job comments and document comments may relate to any desired subject matter. The document start message being present will result in the generation of a fault on the job, which must be acknowledged prior to printing the job. All comments or messages as shown for example in FIG. 11, FIG. 14 portrays a sending means at a remote location from which electronic messages are sent. Means 500 for electronically sending messages from the remote location, includes (1) an operator message sending means 502 for sending messages to be viewed by the system operator, and (2) a controller message sending means 504 for sending messages to the system control means 54 of FIG. 2 for performing control functions. Specifically, an output signal from the electronic sending means 500 at the remote location, is received at an RS232 serial communications port 53 (FIGS. 5B and 14) of the system control means 54 (FIG. 2). The system control means 54 then processes the signal to the user interface 52 or the image output control 60 according to the content and instructions of the received signal received by the system with the job will be printed on the break page or error page accompanying the job to allow the system operator and the message submitter to verify the contents of the various messages sent to the reprographic system upon completion of the print job.

Figure 12:
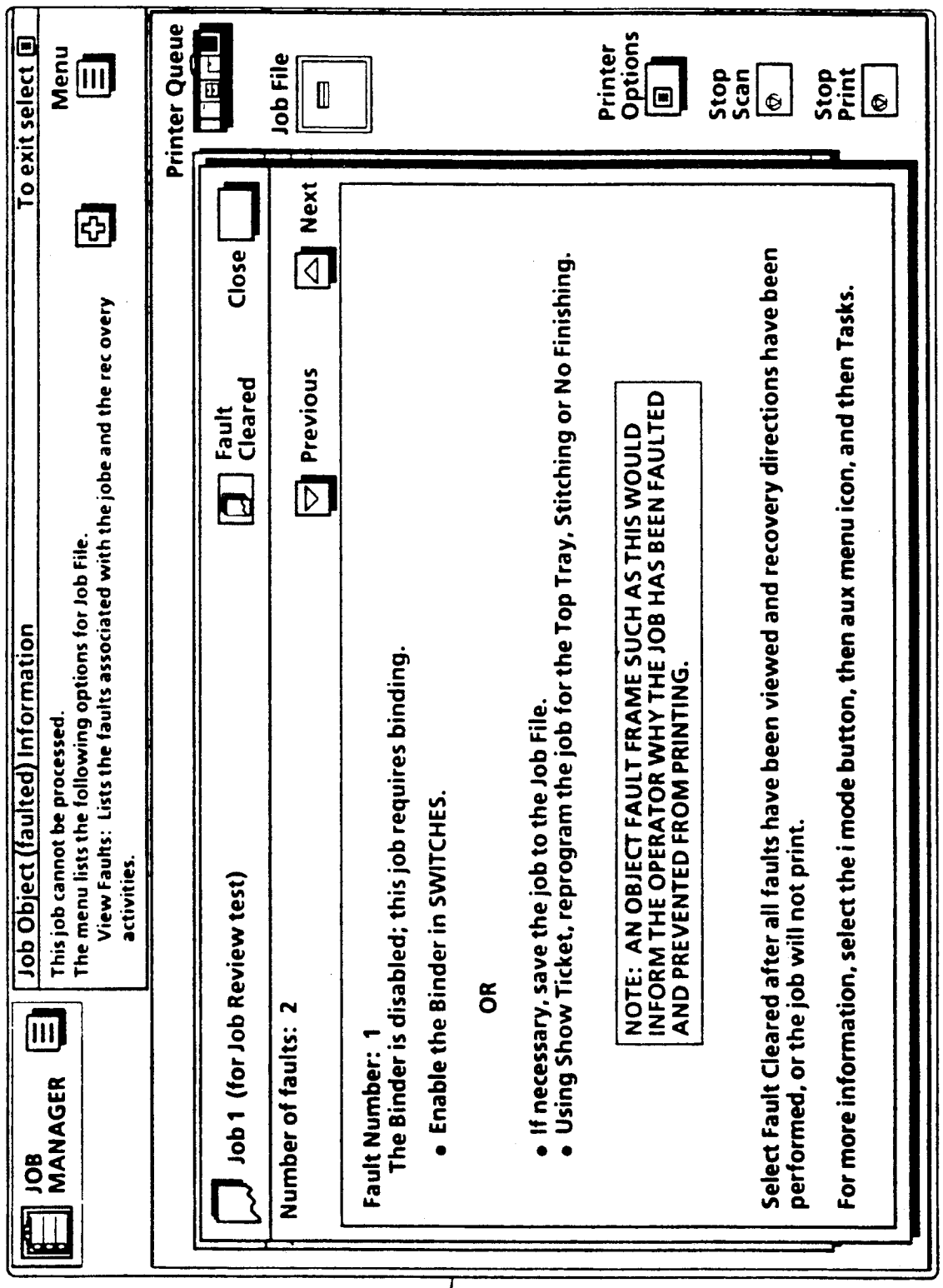
FIG. 12 is an object fault frame.
Figure 13:
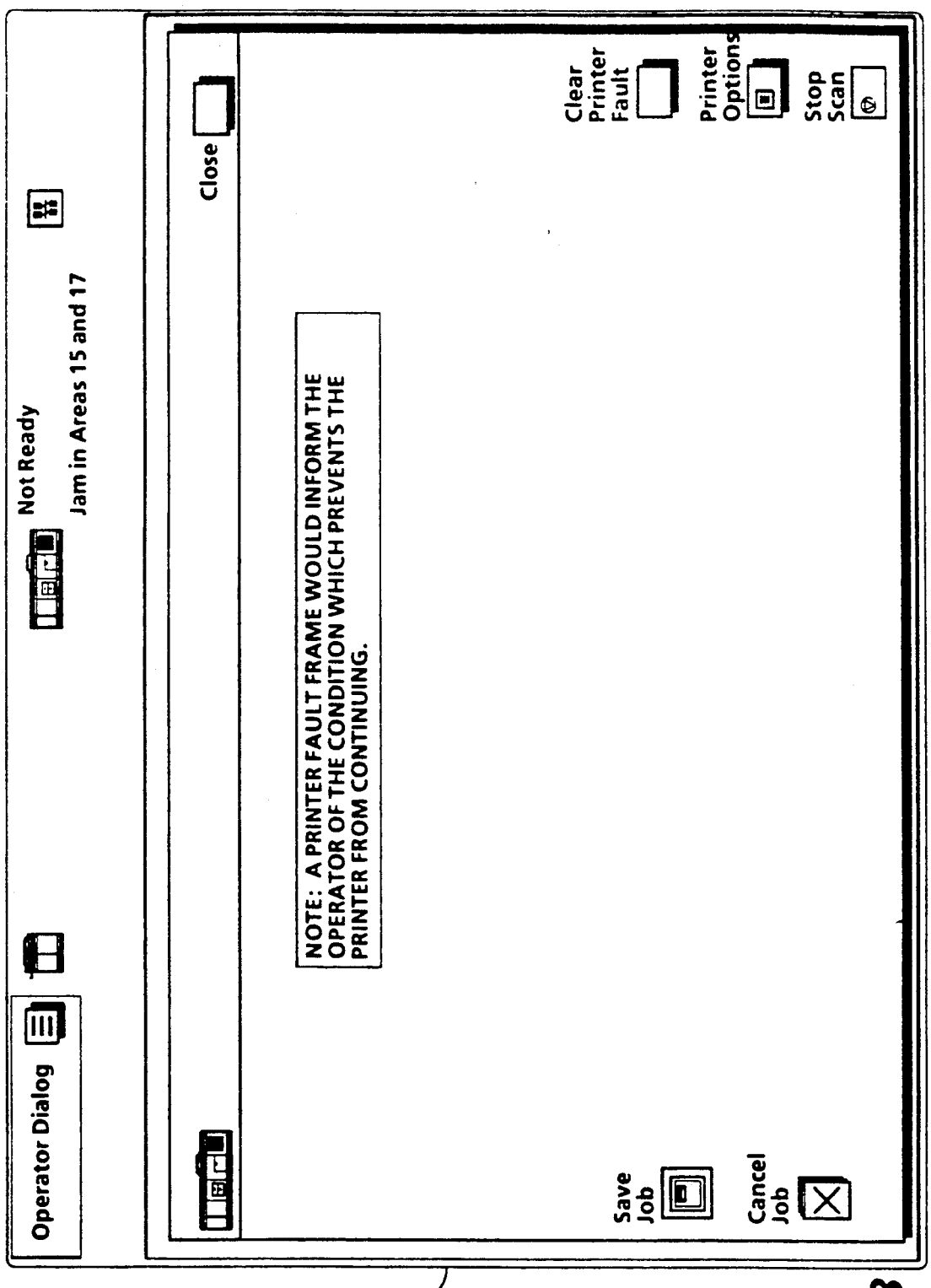
FIG. 13 is a printer fault frame.

FIGS. 12 and 13 show an object fault frame and a printer fault frame respectively. An object fault frame as in FIG. 12 could inform the system operator why the job has been faulted and prevented from printing, whereas a printer fault frame as in FIG. 13, could inform the system operator of the reprographic system condition which prevents the printer from continuing.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and the scope of the invention as defined in the following claims.

What is claimed is:

1. An electronic reprographic printing system comprising:
   means for scanning a set of original documents which comprise a print job:
   means for electronically storing in memory images of the scanned documents as electronic pages;
   means for converting electronic images into printed pages;
   control means for controlling the scanning means, storing means, and converting means;
   means for electronically sending as necessary stored and interactive electronic job comment messages associated with the scanned documents of the print job from a remote location to the control means, said sending means electronically cooperating with said control means; and
   remote operator interaction means for creating and editing specific electronic job comment messages and instructions concerning the print job to be printed at the reprographic printing system.

2. The electronic reprographic printing system of claim 1, wherein the means for converting comprises message printing means for printing the electronic job comment messages sent from a remote location onto pages at an end of the print job.

3. The electronic reprographic printing system of claim 1, further comprising system operator interaction means for allowing a reprographic system operator to interact with the control means.

4. The electronic reprographic printing system of claim 3, wherein the system operator interaction means comprises a display means for displaying the electronic messages job comment for review by the reprographic system operator.

5. The electronic reprographic printing system of claim 1, wherein the sending means comprises both a remote operator message sending means and a controller message sending means, wherein the operator message sending means sends messages to be viewed by the reprographic system operator; and
   wherein the controller message sending means sends messages to the control means instructing the control means to perform control functions.

6. The electronic reprographic printing system of claim 3, wherein the system operator interaction means is a video monitor combined with an operator input device selected from the group consisting of a touch screen, keyboard and mouse.

7. The electronic reprographic printing system of claim 5, wherein the control means comprises a faulting means for stopping the converting means from operating in response to a fault message generated by the controller message sending means.

8. The electronic reprographic printing system of claim 7, wherein the system operator interaction means comprises a message receipt acknowledgment means for acknowledging receipt of a remote operator generated electronic job comment message and for instructing the control means to restart the converting means.

9. A method for sending messages in an electronic reprographic printing system, the steps comprising:
   creating electronic page images which comprise a print job;
   sending the electronic page images from a remote location to a controller of an electronic reprographic printer;
   sending as necessary stored and interactive electronic job comment messages associated with the electronic page images from the remote location to the controller, said electronic job comment messages being specific messages and instructions which can be created and edited by a remote operator concerning the print job to be printed at the reprographic printing system;
   storing in memory the electronic page images and electronic job comment messages;
   converting the electronic page images form electronic pages into printed pages; and
   controlling by means of the controller the storing and converting steps to provide visual messages for a reprographic printing system operator.

10. The method of claim 9, wherein the step of converting the electronic page images into printed pages comprises the steps of converting the electronic job comment messages into printed pages after converting the electronic page images from electronic pages into printed pages.

11. The method of claim 9, further comprising a step of displaying the electronic job comment messages on a display means for review by the reprographic printing system operator.

12. The method of claim 9, wherein the step of electronic job comment comprises sending operator messages a further controller messages further for instructing the controller to perform control functions.

13. The method of claim 9 further comprising a step of linking, prioritizing and truncating the electronic job comment messages by the controller before displaying the messages for review by the reprographic system operator.

14. The method of claim 9, wherein one of the controller message is a fault messages stops the converting operation.

15. The method of claim 14, further comprising the steps of the reprographic printing system operator viewing the electronic job comment messages, acknowledging receipt of the electronic job comment messages and instructing the controller to restart the converting operation.

16. An electronic reprographic printing system comprising:
   means for creating electronic page images;
   means for sending the electronic page images from a remote location to a control means of an electronic reprographic printer for controlling electronic page images processing;
   means for sending as necessary stored and interactive electronic job comment messages associated with the electronic page images from the remote location to the control means;
   means for storing the electronic page images and electronic messages within the control means; and
   means for converting the electronic page images into printed pages,
   wherein the control means controls the means for storing and means for converting.

17. The electronic reprographic printing system of claim 16, wherein the means for converting further comprises a means for converting the electronic job comment messages into printed pages at an end of a print job.

18. The electronic reprographic printing system of claim 16, further comprising operator interaction means for allowing a reprographic system operator to interact with the control means.

19. The electronic reprographic printing system of claim 18, wherein the operator interaction means comprises a display means for displaying the electronic job comment messages for review by the reprographic system operator.

20. The electronic reprographic printing system of claim 16, wherein the means for sending messages comprises a remote operator message sending means and a controller message sending means, wherein the remote operator message sending means sends electronic job comment messages to be viewed by the reprographic system operator, and wherein the controller message sending means sends messages to the control means instructing the control means to perform control functions.

21. The electronic reprographic printing system of claim 18, wherein the operator interaction means is a video monitor combined with an operator input device selected from the group consisting of a touchscreen, keyboard and mouse.

22. The electronic reprographic printing system of claim 19, wherein the control means comprises operator message formatting means for linking, prioritizing and truncating related operator messages for display on the display means.

23. The electronic reprographic printing system of claim 20, wherein the control means comprises a faulting means for stopping the converting means from operating in response to a fault message generated by the controller message sending means.

24. The electronic reprographic printing system of claim 23, wherein the operator interaction means comprises a message receipt acknowledgement means for acknowledging receipt of the electronic job comment message and for instructing the control means to restart the converting means.

25. The method of claim 9, wherein the step of storing in memory comprises recognizing that an electronic job comment message has been sent with the print job, and automatically routing the print job and the electronic job comment message to a job file for storage therein, until the reprographic printing system operator can review the electronic job comment message.

26. The electronic reprographic printing system of claim 16, wherein the means for storing is a job file for storing both electronic page images and electronic job comment messages for later review by a system operator.

27. An electronic reprographic printing system comprising:

a display means for displaying information;

means for scanning a set of original documents which comprises a print job;

means for electronically storing in memory images of the set of scanned documents as electronic pages;

means for converting electronic images into printed pages;

control means for controlling the scanning means, storing means and converting means, said control means including electronic job comment message formatting means for linking, prioritizing and truncating related electronic job comment messages for display on the display means;

reprographic system operator interaction means for allowing a reprographic system operator to interact with the control means, said reprographic system operator interaction means including a display means for displaying the electronic job comment messages for review by the reprographic system operator; and means for electronically sending as necessary stored and interactive electronic job comment messages along with associated electronic pages from a remote location, said electronic job comment messages being specific messages and instructions which can be created and edited by a remote operator concerning the print job to be printed at the reprographic printing system.

* * * * *